(12) United States Patent
Heimberg et al.

(10) Patent No.: US 6,989,133 B1
(45) Date of Patent: Jan. 24, 2006

(54) DEVICE FOR CARRYING OUT CHEMICAL REACTIONS

(75) Inventors: Wolfgang Heimberg, Ebersberg (DE); Michael Weichselgartner, Ebersberg (DE)

(73) Assignee: MWG-Biotech AG, Ebersberg (DE)

( * ) Notice: Subject to any disclaimer, the term of this patent is extended or adjusted under 35 U.S.C. 154(b) by 0 days.

(21) Appl. No.: 09/869,230

(22) PCT Filed: Dec. 16, 1999

(86) PCT No.: PCT/EP99/10022

§ 371 (c)(1),
(2), (4) Date: Jun. 25, 2001

(87) PCT Pub. No.: WO00/40330

PCT Pub. Date: Jul. 13, 2000

(30) Foreign Application Priority Data

Dec. 30, 1998 (DE) ................................ 198 60 821

(51) Int. Cl.
*B32B 27/04* (2006.01)

(52) U.S. Cl. .................................................... 422/131
(58) Field of Classification Search ............. 422/62, 422/63, 64, 131, 188
See application file for complete search history.

(56) References Cited

U.S. PATENT DOCUMENTS

| 3,306,006 | A |   | 2/1967 | Urban ........................... 55/25 |
| 5,310,523 | A | * | 5/1994 | Smethers et al. ............. 422/57 |
| 5,501,837 | A | * | 3/1996 | Sayles ......................... 422/58 |
| 5,538,694 | A |   | 7/1996 | Delius ....................... 422/131 |
| 5,837,858 | A |   | 11/1998 | Brennan .................... 536/25.3 |
| 6,440,369 | B1 | * | 8/2002 | Oonuma et al. .............. 422/64 |

FOREIGN PATENT DOCUMENTS

| CA | 1304916 | 7/1992 |
| DE | 3525678 A1 | 1/1986 |
| DE | 3813671 A1 | 11/1989 |

(Continued)

OTHER PUBLICATIONS

International Search Report for corresponding PCT/EP99/10022, no date avail.

(Continued)

*Primary Examiner*—Jonathan Johnson
(74) *Attorney, Agent, or Firm*—Rankin, Hill, Porter & Clark LLP

(57) ABSTRACT

The invention relates to an apparatus for the conduct of chemical reactions, comprising:
  a reaction slider in which are formed a multiplicity of through holes serving as reaction chambers,
  a selector slider located on the upper surface of the reaction slider and having at least one continuous control orifice, wherein the selector slider is movable relative to the reaction slider in such a way that its control orifice may be brought into alignment with one of the reaction chambers of the reaction slider, so that a through connection to supply the reaction chamber with a predetermined reagent may be made, and
  a chemical slider, located beneath the reaction slider and provided with passages to supply chemicals to the individual reaction chambers of the reaction slider.

Figure 1:
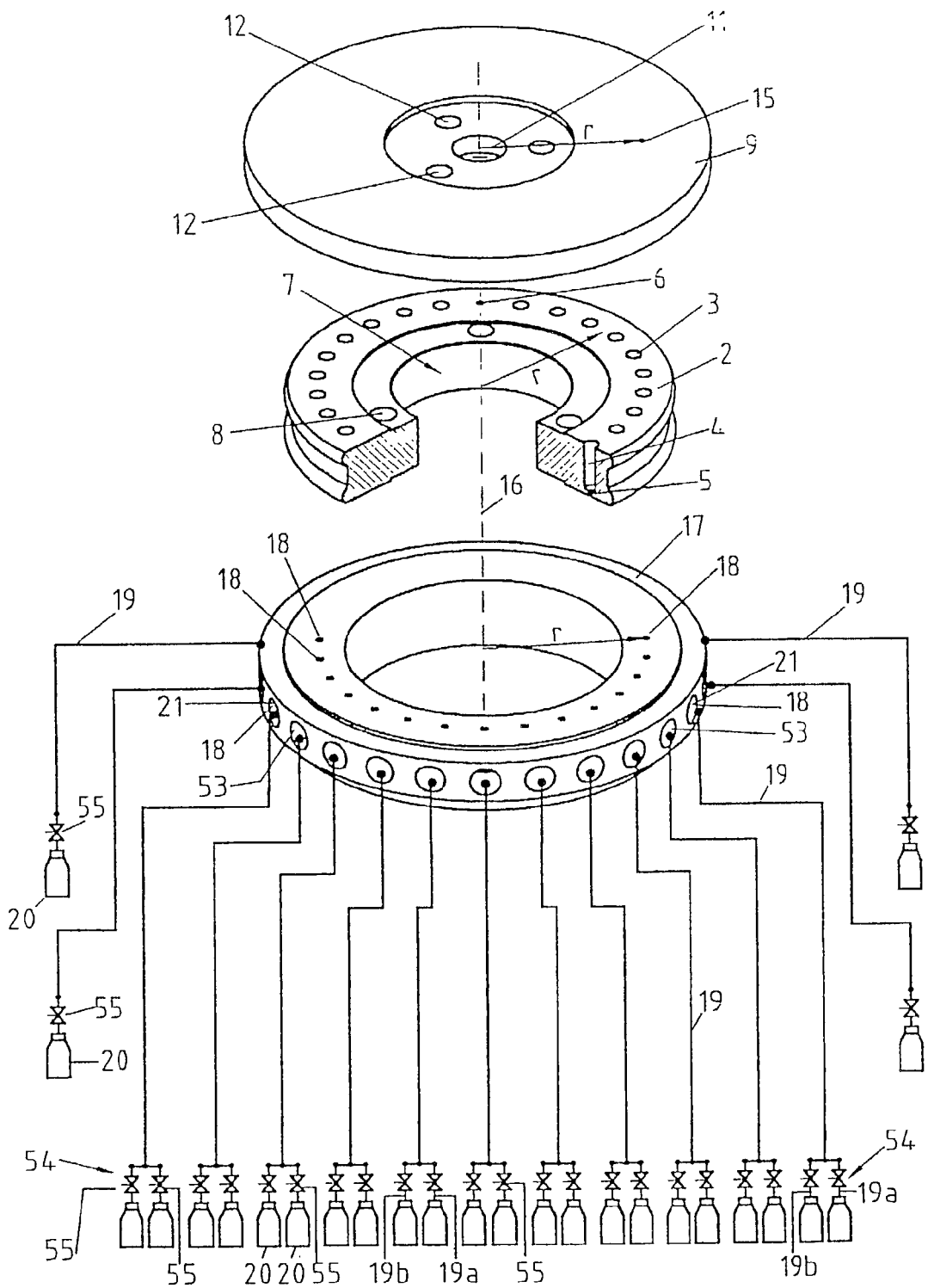

The invention is distinguished on the one hand by a device to apply a predetermined force to the sliders and on the other hand by a valve assembly by means of which chemicals may be supplied to the chemical slider in premixed form.

27 Claims, 4 Drawing Sheets

| | FOREIGN PATENT DOCUMENTS | |
|---|---|---|
| EP | 0164206 A1 | 12/1985 |
| EP | 0181491 A1 | 5/1986 |
| EP | 0164206 B1 | 11/1988 |
| EP | 0181491 B1 | 6/1989 |
| EP | 0629144BE | 10/1995 |
| JP | 62294693 A | 12/1987 |
| JP | 62298599 A | 12/1987 |
| WO | 9857181 | 12/1998 |
| WO | 9965602 | 12/1999 |

OTHER PUBLICATIONS

German Office Action issued in corresponding application DE 19860821.7, dated Dec. 3, 1999.

Baier et al., "Synthesis and Purification in a Single Column on a High-Throughput Automated Oligonucleotide Production System," Product Application Focus, XP-000857679, vol. 20, No. 2 (1996), pp. 298-303.

* cited by examiner

DEVICE FOR CARRYING OUT CHEMICAL REACTIONS

The invention relates to an apparatus for the conduct of chemical reactions. In particular the invention relates to an apparatus for the conduct of chemical syntheses, preferably for the synthesis of oligonucleotides.

Such apparatuses are known for example from EP 0 146 206 B1 and EP 0 181 491 B1. These apparatuses each have several reaction discs arranged above one another in stacks and in each of which are arranged three or four continuous thin bores serving as ducts and a bore with at least partially greater cross-section serving as reaction vessel. The reaction discs have a central bore through which passes a pin serving as connecting element. The ends of each pin are provided with a thread, on which is screwed a nut, to hold the reaction discs together with considerable force.

The reaction discs may be rotated around the pins, which involves loosening the screw connection. By rotating the reaction discs around the pins, the ducts are brought into alignment with one of the reaction chambers, in order to supply a specific reagent to the reaction vessel.

JP 62 298599 A discloses an apparatus similar in design to the apparatus according to EP 0 164 206 B1, but with only a single reaction vessel in each disc.

Such apparatuses have not proved successful in practice, since the number of reactions which may be carried out simultaneously is limited and, for each change in the combination of reagents to be supplied to a particular reaction chamber, the screw connection must be released and the reaction discs rearranged by hand.

Described in DE 38 13 671 A1 is an apparatus for the conduct of chemical reaction sequences which has a stack of reaction plates arranged on top of one another and optionally movable relative to one another in steps, and with passages arranged at the step spacing, one of which in each case forms a reaction chamber. A plate adjustment device provides for the optional shifting of a particular plate relative to the rest of the plate stack. A lever mechanism is provided to apply pressure to the plates after movement, so as to ensure a perfect seal of the passages formed in the plates.

Known from EP 629 144 B1 is an apparatus for the conduct of chemical reactions proceeding simultaneously or consecutively, in which chemical reactions may proceed simultaneously in a multiplicity of reaction chambers, as e.g. in the synthesis of oligonucleotides. Provided for this purpose instead of discs are rods, arranged on top of one another and automatically movable relative to one another. A single rod contains a large number of reaction chambers. Below and above each of the rods with reaction chambers is a rod with a single through hole, by means of which in each case a particular reaction chamber may be connected on one side to a vessel containing a reagent, and on the other side to a suction pump to draw the reagent into the reaction chamber. In particular it is possible to perform a large number of such suction processes at short intervals of time, with scope for selecting a different reagent and a different reaction chamber in each case. By this means any desired combinations of reagents may be combined in the reaction chambers and brought to chemical reaction in rapid sequence.

A further advantage of this known apparatus is that both the dead volumes required for control of chemicals and also the reaction chambers can be kept small, thereby minimising consumption of reagents which—in particular for oligonucleotide synthesis—are very expensive. In further known apparatuses (e.g. DE 35 25 678 A1) valves are used to control the flow of chemicals. Such valves have a large dead volume, resulting in a low chemical efficiency.

In the apparatus known from EP 0 629 144 B1, the rods are pressed together with high pressure, so that their contact faces fit tightly together and no reagents creep between the rods. However, when the rods are moved against one another, the high pressure results in considerable wear. It is also difficult to manufacture elongated rods of this kind with the necessary precision and strength. There is always the danger of such rods becoming distorted during hardening. The maximum number of reaction chambers is limited by the maximum length of the rods which can be made at a reasonable technical and economic cost.

WO 98/57181 describes an apparatus with several reaction vessels arranged in a carousel. The carousel is driven via a belt by means of a stepping motor, so that it can be rotated around a central, vertical axis. The individual reaction vessels are arranged concentrically to this axis. On the top of the carousel is an injection plate and on the bottom an evacuation plate. These two plates are static and are provided with passages so that a fluid may be conveyed from the injection plate through a reaction vessel and through an opening in the evacuation plate. A clamping mechanism is provided in such a way that the position of the plates may be controlled in a suitable manner.

The invention is based on the problem of developing an apparatus for the conduct of chemical reactions of the type described above so that, despite a simple and compact design, a high throughput is ensured by a large number of reaction chambers.

The problem is solved by an apparatus with the characteristics of claim 1 and by an apparatus with the characteristics of claim 9 respectively. Advantageous developments are set out in the subsidiary claims.

The apparatus according to the invention for the conduct of chemical reactions comprises:
  a reaction slider in which are formed a multiplicity of through holes serving as reaction chambers,
  a selector slider located on a side of the reaction slider at which the reaction chambers emerge, and having a continuous control orifice, wherein the selector slider is movable relative to the reaction slider,
  a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and a device is provided to apply a force to the sliders in order to seal their contact faces, this device being so designed that the force acts in the area of the axis of rotation.

This circular arrangement of the reaction chambers on the reaction slider allows the reaction slider to have a very compact design with a multiplicity of reaction chambers.

This circular arrangement of the reaction chambers, combined with the centrally-acting pressure-loading device for pressing the sliders together, generates a pressure distribution which is symmetrical around the axis of rotation, so that even with a multiplicity of reaction chambers pressure is distributed evenly on the areas of the individual reaction chambers. By this means it is ensured that, despite there being a multiplicity of reaction chambers, they are reliably sealed. The invention makes it possible to provide many reaction chambers, thus obtaining a high throughput, while the sealing of the many reaction chambers is simultaneously ensured.

With this pressure-loading device the sliders can be pressed together in a defined position with a predetermined force, e.g. 100 N, while the force is reduced or released to rotate the sliders, so that wear is minimised and the seal at the contact faces of the sliders is maintained over a long period of time.

Due to the circular form of the reaction sliders, the sliders may be plate-shaped and may be made in particular in the form of an annular disc, thereby considerably reducing the cost of production in comparison with the rods known from EP 0 629 144 B1. This is based on the fact, amongst other things, that plates may be designed with flat surfaces much more easily than rods, which also often become distorted during hardening. This circular arrangement of the reaction chambers thus allows simpler manufacture of flat and therefore leakproof contact faces.

According to a further preferred embodiment, there is provided a drive unit with a cylindrical stationary drive housing and two concentric hollow shafts arranged one inside the other, on which the reaction slider and the selector slider may be placed so as to be non-rotatable. This provision of the drive unit separate from the sliders permits simple and rapid replacement of the sliders, which may be non-rotatably connected to the drive unit, preferably by means of a plug-in connection. By this means it is possible e.g. to change the number of reaction chambers by exchanging the reaction slider, in order to adapt to particular requirements.

The solution according to claim 8 provides an apparatus for the conduct of chemical reactions with:
- a reaction slider in which are formed a multiplicity of through holes serving as reaction chambers,
- a selector slider located on a side of the reaction slider at which the reaction chambers emerge, and having a continuous control orifice, wherein the selector slider is movable relative to the reaction slider,
- a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be a lower area 5 of smaller internal diameter. If the apparatus according to the invention is meant to be used for the synthesis of oligonucleotides then frit, in itself known, is used to hold the reagents.

The reaction chambers 3 may also be designed to hold cartridges, which are described in German registered design application DE 299 21 606.3. Such cartridges facilitate the sealing of the reaction chambers.

In addition to the reaction chambers 3, the orbit also has two through holes with a continuously narrow internal diameter, which are used as flushing passages 6. The two flushing passages 6 are diametrically opposite on the orbit, and divide the reaction chambers 3 into two sections of twelve reaction chambers 3 each. The reaction slider 2 is provided with a central opening 7. Adjacent to the central opening 7 are three continuous drive holes 8 arranged at the same angular distance around the centre point of the reaction slider 2.

In the apparatus according to the invention the reaction slider 2 is mounted horizontally, with a selector slider 9 provided adjacent to its top side. In the present embodiment the selector slider 9 is comprised of a steel plate with a central opening 11 which is circular viewed from above. Adjacent to the central opening 11, the selector slider 9 has three drive holes 12 arranged at the same angular distance. The selector slider 9 has a larger diameter than the reaction slider 2. Provided in the selector slider 9 is a continuous vertical control orifice 15. The control orifice 15 of the selector slider 9 is positioned from the centre point of the selector slider 9 at a distance equal to the radius r of the orbit on which the reaction chambers 3 of the reaction slider 2 are arranged so that, when the selector slider 9 is rotated, the control orifice 15 describes the same orbit as the reaction chambers 3.

By this means, by rotating the selector slider 9 relative to the reaction slider 2 around the common vertical central axis 16, the control orifice 15 may be brought into alignment with any one of the reaction chambers 3 or with one of the flushing passages 6, resulting in each case in a continuous passage through the selector slider 9 and the reaction slider 2.

The selector slider 9 and the reaction slider 2 are mounted on a chemical slider 17. The chemical slider 17 is a steel ring with for instance a rectangular, for example square, cross-section. The chemical slider-17 is arranged concentrically to the common vertical axis 16 and has a multiplicity of through holes 18, arranged along an orbit with radius r around the common axis 16. The through holes 18 are preferably spaced at an equal distance from one another around the orbit, with the distance between two adjacent through holes 18 preferably differing from the distance between two adjacent reaction chambers 3 of the reaction slider 2, so that in each case only a single through hole 18 can be in communication with a single reaction chamber 3.

In an alternative embodiment, the angular distances between two adjacent through holes 18 correspond to the angular distances between two adjacent reaction chambers 3. With this embodiment, in the pauses between two chemical supply processes the reaction slider 2 is moved by an intermediate step relative to the chemical slider 17, corresponding e.g. to half the angular distance between two adjacent reaction chambers 3, so that none of the reaction chambers 3 is aligned with any of the through holes 18, and the reaction chambers 3 do not overlap any of the through holes 18. By this means, any flow of chemicals into the reaction chambers 3 is reliably prevented.

The through holes 18 of the chemical slider 17 are bent towards its outer circumferential surface 53, where they emerge in the form of connection orifices 21. Connected to the connection orifices 21 are chemical feed lines 19 e.g. in the form of tubing, each leading to a valve assembly 54, via which two or more different chemicals may be supplied to the chemical feed line.

In the embodiment depicted in FIG. 1, some of the chemical feed lines 19 divide into two branch lines 19a, 19b, each having a control valve 55 and leading to a chemical container 20 containing a predetermined reagent. The through holes 18 of the chemical slider 17 connected to a branching chemical feed line 19 may thus be supplied with a predetermined reagent or with a predetermined mixture of two reagents. The through holes 18 thus function as chemical feed orifices for feeding chemicals to the reaction chambers 3 of the reaction slider 2.

Each of the unbranched chemical feed lines 19 leads to a single chemical container 20. Expediently located in these chemical feed lines are further control valves 55, which are able to prevent an unintended flow of chemicals from one of the chemical containers 20 to a reaction chamber 3.

In the apparatus according to the invention the chemical slider 17 is stationary and, for rotation of the selector slider 9 and the reaction slider 2, each of the latter is provided with a drive unit (not shown in FIG. 1), so that the selector slider 9 may be rotated through at least one full revolution (360°) around the common axis 16 independently of the reaction slider 2. The control orifice 15 of the selector slider 9 is connected via a further line (not shown) to a metering pump.

The basic mode of operation of the slider assembly shown in FIG. 1, for the conduct of chemical reactions, will be explained in detail below.

The individual chemical containers 20 contain various reagents so that two reagents may be fed to the relevant through holes 18 of the chemical slider 17 via the valve assemblies 54. By locating one of the reaction chambers 3 over a specific through hole 18 of the chemical slider 17, and by simultaneous placing of the control orifice 15 of the selector slider 9 over this reaction chamber 3, one or more reagents may be fed to the reaction chamber 3 from the predetermined through hole 18 by suction using a metering pump (not shown). In the case of the valve assemblies of the present embodiment, comprised of two valves 55, either a single valve can be opened so that only a single reagent is supplied, or else both valves may be opened simultaneously or alternately in quick succession so that a mixture of two reagents is supplied.

If an oligonucleotide synthesis is to be conducted then it is expedient to supply the reagents containing the basic structural elements (phosphite amides) mixed with an activator (e.g. tetracol in acetonitrile) since, by premixing the two reagents immediately before feeding them to a reaction chamber, a significantly better reaction is obtained in a shorter time than if the two reagents were supplied intermittently, one after the other.

When the desired amount of a reagent or a mixture of reagents has reached the reaction chamber 3, then the reaction slider 2 and/or the selector slider 9 are rotated, thereby breaking the connection from a chemical container 20 to the metering pump, so that no further flow of chemicals is possible. This reaction chamber 3 may be removed from the through hole 18 of the chemical slider 17 by a short turning movement, so that the reaction chamber 3 is also closed at its lower end. This chemical flow may also be stopped by closing the relevant valves control valve 55.

The process of drawing a specific reagent or mixture of reagents into a specific reaction chamber 3 may be repeated as desired. At the same time the reagents and/or the reaction chambers 3 may be changed in any desired sequence so that a specific amount of a predetermined reagent is fed to each reaction chamber at a predetermined point in time. Since the different rotary positions of the sliders may be set in a few fractions of a second, the individual reaction chambers 3 may be supplied virtually simultaneously with the same or a different sequence of reagents. Specific chemical reactions may thus be generated in the individual reaction chambers 3 in a targeted manner.

Preferably the sliders, in particular the reaction slider 2, are conditioned to a temperature suitable for the chemical reactions concerned.

Figure 2:
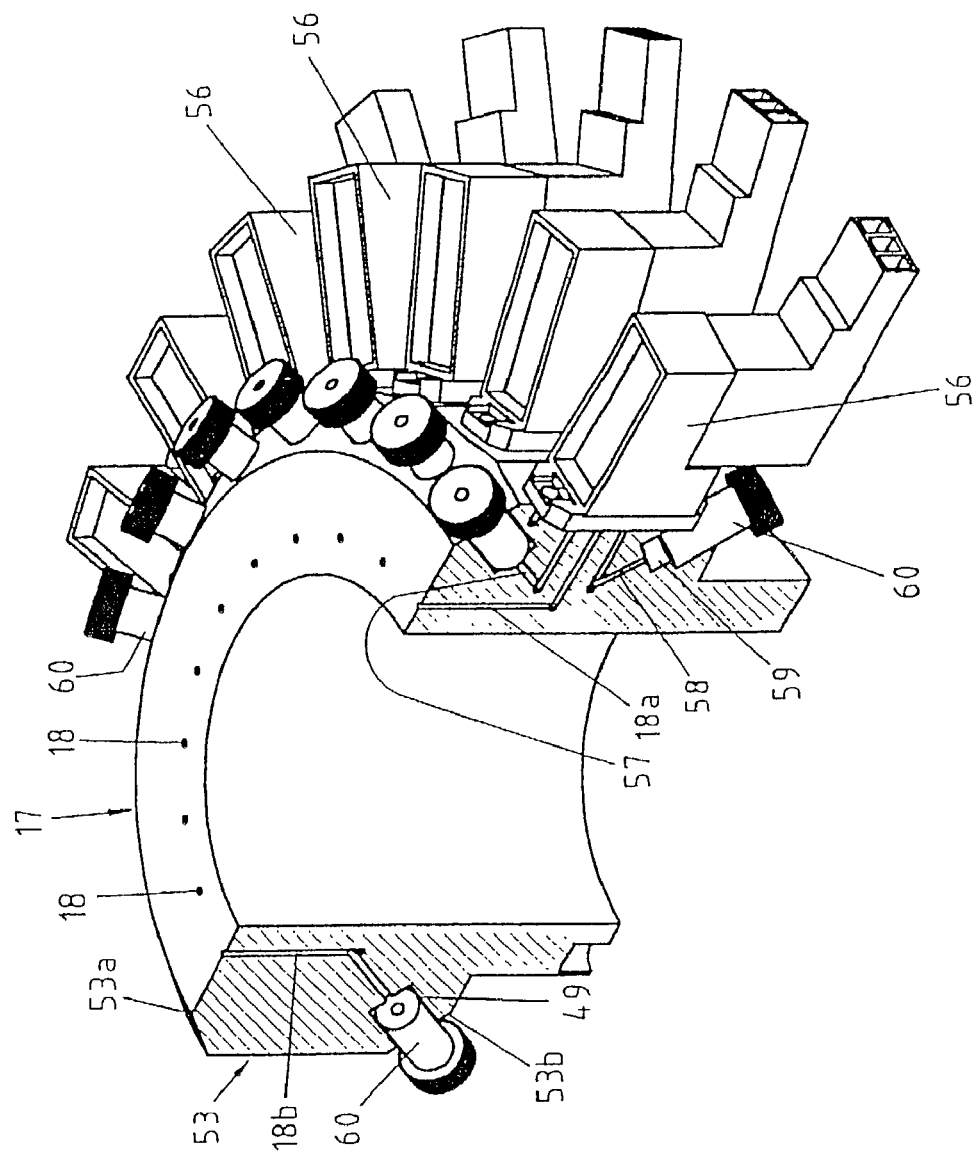

FIG. 2 shows schematically, in a sectioned perspective view, a further embodiment of a chemical slider 17. This chemical slider 17 is comprised of an annular body with an outer circumferential surface 53, bevelled at the top and bottom edges to give surfaces 53*a*, 53*b* running at an angle to the circumferential surface 53.

Two types of through holes 18*a*, 18*b* are provided. The overwhelming majority of through holes 18*a* emerge at the upper surface of the chemical slider 17 and are bent at right-angles to the circumferential surface 53. Provided at this exit point of the through hole 18*a* is a multiway valve 56, which is connected to each of the upper and lower branch lines 57, 58 formed in the chemical slider 17. Each of the two branch lines 57, 58 leads from the circumferential surface 53 to a connection recess 59 formed on the upper or lower bevel 53*a*, 53*b*. These connection recesses 59 may each accommodate a connection element 60 connected to a tube (not shown). Each of the tubes is connected to a chemical container 20 and represents a part of the branch lines 57, 58. In the present embodiment the multiway valves 56 are designed as 2-way valves, connecting one of the through holes 18 to either the upper or lower branch line 57, 58. These 2-way valves 56 have only two states: in one state the upper branch line, and in the other state the lower branch line, is connected to the through hole 18. Such valves have only an extremely low dead volume, so that the losses of chemicals generated by them are very small.

The second type of through hole 18*b* leads from the upper surface of the chemical slider 17 to a single connection recess 59, located on the lower bevel 53*b*, and in which may be accommodated a connection element 60 connected to a tube (not shown) leading to a chemical container.

In the synthesis of oligonucleotides, the following reaction processes are conducted consecutively to add one base in each case. Firstly the 5' protective group is separated from an existing oligonucleotide or an initiating reagent. For this purpose a separating reagent (e.g. trichloroacetic acid) is fed to the reaction chamber.

After the separation process a base is added, by feeding the base reagent (phosphite amide) into the reaction chamber, together with an activator (tetracol in acetonitrile).

The separation process is followed by a capping process in which, by means of two capping reagents (cap-A: acetic anhydride dissolved in tetrahydrofuran; cap-B: n-methyltimidazole dissolved in tetrahydrofuran and a trace of pyridine or colidine) the 5'-ends—activated but not provided with a base—are blocked from any further addition of bases. This prevents the formation of oligonucleotides with undesired base combinations.

The next stage is the oxidation of trivalent phosphorus into pentavalent phosphorus by the addition of iodine dissolved in acetonitrile.

These reaction processes are repeated to add one base at a time. Between each of the individual reaction processes a rinsing reagent (e.g. acetonitrile) is passed through the reaction chambers to remove excess reagents.

The bases generally comprise adenine (A), cytosine (C), guanine (G), thymine (T) and/or uracil (U). Other bases may also be provided, e.g. for marking purposes.

During both the addition process and also the capping process a mixture of two reagents, which can not be stocked as a mixture, is fed to the reaction chamber. Using the apparatus according to the invention, these mixtures are mixed at the chemical slider 17. The mixing is effected by rapid alternate connection of the branch lines 57, 58 to the through hole 18, by means of which the two reagents are intermittently fed to the reaction chamber and mixed. After such a mixture has been fed it is expedient to purge the section of line leading from the valve assembly to the reaction chamber and the reaction chamber itself. The cheapest of the two reagents in the mixture is used for purging.

The reagents (separating reagent, oxidation reagent, rinsing reagent) supplied for the reaction processes in unmixed form are fed to the reaction chamber from the respective chemical container via an unbranched chemical feed line and one of the through holes 18*b*, without the interposition of a valve assembly with a multiway valve.

In the case of this embodiment it is expedient to provide a control valve (not shown) in both the branched and also in the unbranched chemical feed lines, so as to prevent any undesired flow of chemicals.

The chemical slider 17 according to the invention has at least five through holes 18*a* (for four bases and the respective activator and the two capping reagents) connected to a valve assembly and at least three unbranched through holes 18*b* (for the separating reagent, rinsing reagent, oxidation reagent).

Figure 3:
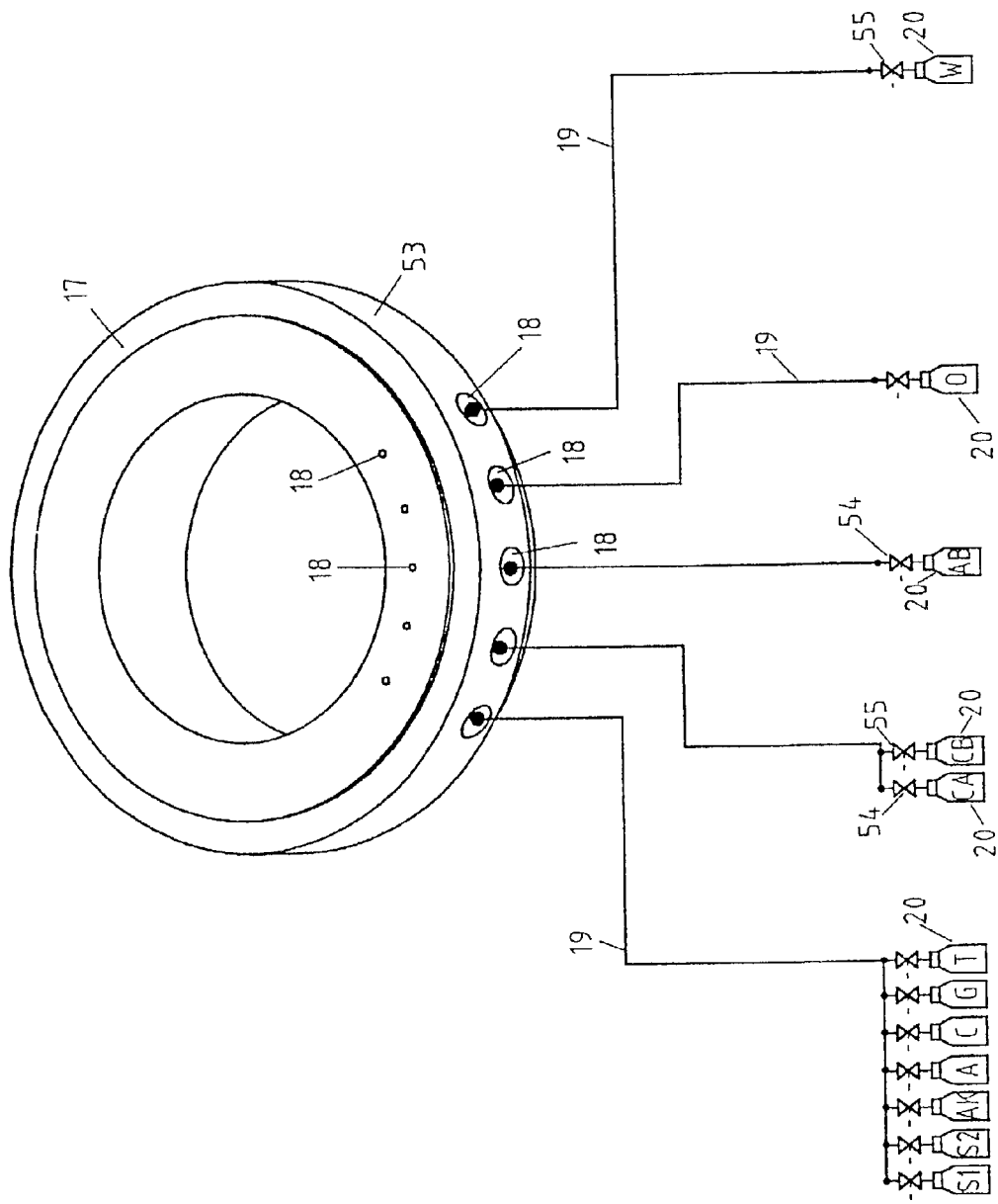

FIG. 3 shows schematically in simplified form a further embodiment of a chemical slider 17. This chemical slider has only five through holes 18, each connected to a valve assembly via a chemical feed line 19. One of the five valve assemblies is a 7-way valve assembly 54 with seven valves 55, each controlling the flow of chemicals from a chemical container 20. A further valve assembly 54 is a 2-way valve assembly 54 with two valves 55, each controlling the flow of chemicals from a chemical container. The remaining three valve assemblies are 1-way valve assemblies, each comprised of a single valve 55.

Connected to the 7-way valve assembly are chemical containers 20 with a first purging agent S1 (e.g. argon), a second purging agent S2 (e.g. acetonitrile), an activator AK and the four base reagents A, C, G and T.

Connected to the 2-way valve assembly are chemical containers 20 with the two capping reagents CA and CB. Connected to the 1-way valve assemblies are chemical containers with a separating reagent AB or an oxidation reagent O or a rinsing reagent W. The chemical containers 20 with the purging agents S1 and S2 are located at the end of the chemical feed line 19 furthest from the through holes 18, so that they purge the whole of the chemical feed line and are thereby able to remove all residues of the other chemicals.

A disadvantage of this embodiment as compared with the embodiment shown in FIG. 2 is that the line section connecting the individual valves 55 and the line section leading to the through holes 18 form a dead volume during the changeover from one reagent to another reagent. Unused chemicals have to be purged from this dead volume, without ever being used. This disadvantage may be limited by short line routing, and is taken into consideration for applications in which specific mixtures of base reagents are fed to the reaction chambers in order to produce in a reaction chamber predetermined amounts of e.g. oligonucleotides differing at a single point. There is an increasing demand for such oligonucleotides which differ only slightly at one or a few points.

A further advantage of this embodiment is that the chemical slider 17 has only a few through holes 18. For these it is easy to select an angular distance which differs from the angular distance of two adjacent reaction chambers 3 in such a way that in each case only a single through hole 18 is aligned with one of the reaction chambers 3, while the other through holes are neither aligned with nor overlap other reaction chambers. If the reaction slider is rotated a little, all communicating connections between the through holes 18 and the reaction chambers 3 are broken, and any undesired flow of chemicals is reliably prevented.

If further bases or other chemicals are be added, then further valve assemblies with two to seven or more valves may be provided.

Figure 4:
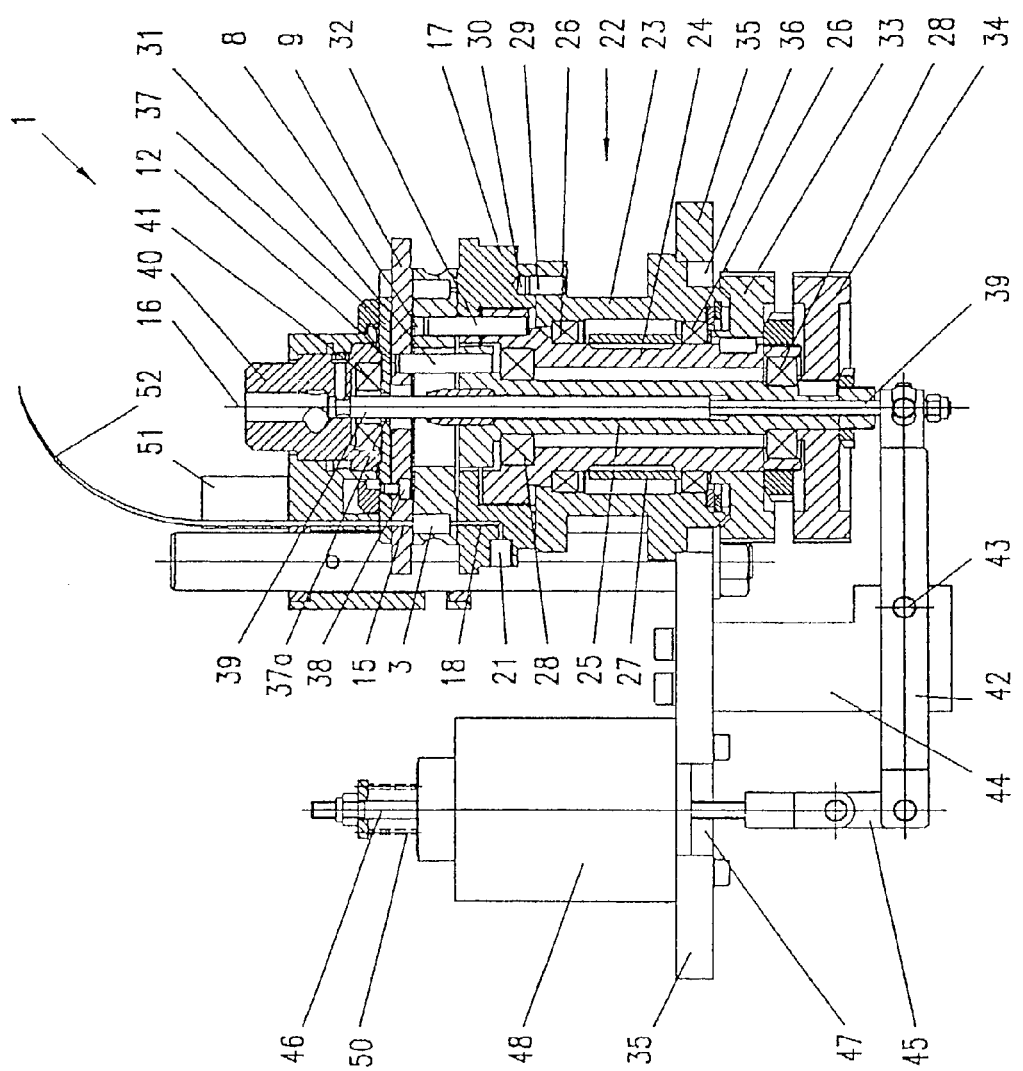

The mechanical set-up of an apparatus according to the invention for the conduct of chemical reactions will be explained in detail below with the aid of FIG. 4.

This apparatus 1 has a unit comprised of a reaction slider 2, a selector slider 9 and a chemical slider 17, with a design substantially the same as that of the unit depicted in FIG. 1.

This unit comprised of the sliders 2, 9 and 17 is mounted on a drive unit 22. The drive unit 22 has an approximately cylindrical stationary drive housing 23 and two concentric hollow shafts 24, 25 arranged one inside the other. The hollow shaft 24 adjacent to the drive housing 23 is pivotably mounted relative to the drive housing 23 by means of two bearings 26. Fitted between the two bearings 26 is a spacer bush 27, in order to keep the bearings 26 a predetermined distance apart. The innermost hollow shaft 25 is in turn pivotably mounted relative to the hollow shaft 24 by means of two further bearings 28.

Fitted to the upper end face of the drive housing 23 are pins 29 which extend vertically upwards and engage in corresponding blind holes 30 of the chemical slider 17.

The upper end face of the innermost hollow shaft 25 is provided with drive pins 31 which project vertically upwards and engage in the drive holes 12 (FIG. 1) of the selector slider 9. In similar fashion, drive pins 32 engaging in the drive holes 8 of the reaction slider 2 are provided on the upper end face of the hollow shaft 24 which is adjacent to the drive housing 23.

The chemical slider 17, the selector slider 9 and the reaction slider 2 are thus connected non-rotatably, by means of a releasable plug-in connection, with the drive housing 23 and the two hollow shafts 24, 25 respectively. Provided at the bottom end of the two hollow shafts 24, 25 and extending radially outwards from them are gear rims 33, 34, on which a stepping motor (not shown) can act, in each case connected via a toothed belt. In its lower section the drive housing 23 is non-rotatably connected to a baseplate 35, while the entire drive unit 22 extends through an opening 36 formed in the baseplate 35.

On the selector slider 9 lies a pressure plate 37, non-rotatably connected to the selector slider 9 by means of a screw connection 38. The pressure plate 37 is provided with a central opening 37*a*, through which passes the common, vertical axis 16 of the sliders 2, 9, 17. In addition the innermost hollow shaft 25 is mounted concentrically to the axis 16, thus forming a passage from the pressure plate 37 to the bottom end section of the drive unit 22. Located in this passage is a connecting rod 39, which extends upwards above the pressure plate 37 and downwards a little below the drive unit 22. At its upper end the connecting rod 39 is connected to a pressure piston 40 which lies on top of the pressure plate 37, while a bearing 41 is inserted between the pressure piston 40 and the pressure plate 37, so that the pressure plate 37 may be rotated relative to the pressure piston 40. Pivoted at the lower end of the connecting rod 39 is a rocker arm 42, which extends roughly parallel to the baseplate 35 and is rotatably attached to a tilting hinge 43 at its longitudinal centre. The tilting hinge 43 is mounted on a web 44 extending downwards from the baseplate 35.

At the end of the tilting hinge 43 which is furthest from the connecting rod 39, a vertically upright armature bar 46 is pivotably attached by means of an intermediate linkage 45. The armature bar 46 runs through a further opening 47 in the baseplate 35, and through an electromagnet mounted in a magnet housing 48. The top end of the armature bar 46 projects from the magnet housing 48. Provided in the magnet housing 48 is a cylinder-barrel-shaped armature through which the armature bar 46 passes. The armature is firmly connected to the armature bar 46. A pressure-loaded spiral spring 50 rests on the top of the magnet housing 48 and is connected to the bottom end of the armature bar 46.

In the de-energised state of the electromagnet 48, the armature is shifted upwards, so that the armature bar 46 is pressed upwards by the action of the spiral spring 50. The force exerted by the armature bar 46 on the rocker arm 42 is converted by the latter into a downwards-acting tensile force on the connecting rod 39, which in turn presses the pressure piston 40 downwards against the pressure plate 37. The sliders 2, 9 and 17 are thus pressed together between the drive housing 23 and the pressure plate 37 with a predetermined force, which may be e.g. 100 Newtons.

If the electromagnet 48 energised, then the armature is pulled into the electromagnet, causing the armature bar 46 to drop and the connecting rod 39 to lift, whereby the pressure on the sliders 2, 9, 17 is reduced or even lifted completely.

In the apparatus according to the invention, during rotation of the selector slider 9 and/or the reaction slider 2, the pressure acting on the contact faces between the sliders may therefore be temporarily reduced or completely lifted, so that the wear from rotation of the sliders is significantly less than in the case of conventional automatically operating apparatus. In addition, the application of pressure ensures the necessary sealing during suction of reagents.

For further avoidance of slider wear, the sliders may be provided with a PFD—or a ceramic coating. Instead of steel sliders, sliders of plastic, ceramic or glass materials, in particular material such as Teflon with low sliding resistance and good resistance to chemicals, are possible.

The invention has been explained above with the aid of an embodiment with 24 reaction chambers. 48 or 96 reaction chambers may also be provided. 24, 48 or 96 are the preferred number of reaction chambers since the reaction products generated are generally placed in vessels on a micro-titration plate. Conventional micro-titration plates have 96 reaction vessels so that, with 24, 48 or 96 reaction chambers, all the vessels of a micro-titration plate can be filled with synthesis products from one, two or four synthesising processes.

In a preferred embodiment of the present invention, a display unit with one window for each reaction chamber is provided. In each of these windows, a significant value for the quality of the synthesising process is displayed.

Provided for this purpose is an optical sensor 51, mounted as close as possible to the reaction chambers 3 and the upper selector slider 9. In the present embodiment the optical sensor 51 is mounted directly on an upper housing cover. However it is also possible to integrate the optical sensor in the selector slider 9 adjacent to the control orifice 15. From the optical sensor 51 a line 52 leads to the metering pump (not shown) which is in the form of a suction pump. The optical sensor 51 detects the light transmittance (turbidity) of the intermediate or end product drawn from the reaction chambers 3 between each individual stage of the process.

By mounting the optical sensor 51 close to the selector slider 9, a rapid response in the light intensity measurement is obtained, since the intermediate and end products produced in the reaction chambers have to be conveyed only a short distance before they can be detected by the sensor 51. Moreover, with this arrangement of the sensor 51, stray light is safely screened from the detection zone.

During oligonucleotide synthesis which is proceeding correctly, the intermediate products gradually become cloudy with each stage of reaction, due to an increase in the DMT content (DMT=dimethyl). In known oligonucleotide synthesis apparatus, the light intensity obtained at each stage is output as a numerical value. With several reaction chambers, this generates a corresponding number of columns of figures, resulting in an unmanageable number of numerical values after only a few process stages have elapsed.

With the apparatus according to the invention this large number of numerical values is avoided, since for each reaction chamber only one significant value for the quality of the current oligonucleotide synthesis is displayed.

This significant value for the quality of the current oligonucleotide synthesis may be e.g. the correlation coefficient R of the detected light intensities.

The correlation coefficient R is calculated in accordance with the following formula:

$$R = \frac{m\sigma_i}{\sigma_s},$$

wherein s is the light intensity detected from a measurement and the individual measurements are counted by the numerator i, and $\sigma_s$ is the standard deviation of the measured values s, $\sigma_i$ the standard deviation of the numerator i, and m the slope of the regression lines in a coordinate system in which the light intensity is plotted on the ordinate and the numerator on the abszisse.

The standard deviation $\sigma_s$, the standard deviation $\sigma_1$ and the slope m are calculated according to the following formulae:

$$\sigma_s = \sqrt{\frac{\sum_N s^2 - \frac{\left(\sum_N s\right)^2}{N}}{N-1}}$$

$$\sigma_i = \sqrt{\frac{\sum_N i^2 - \frac{\left(\sum_N i\right)^2}{N}}{N-1}}$$

$$m = \frac{\sum_N si - \frac{\sum_N s \sum_N i}{N}}{\sum_N i^2 - \frac{\left(\sum_N i\right)^2}{N}}$$

wherein N is the total number of measured values.

In the coordinate system described above, when the oligonucleotide synthesis is proceeding correctly then, due to the gradual development of cloudiness, the light intensities will lie roughly on a slightly falling straight line. Only if there is a fault in the oligonucleotide synthesis will there be light intensity values deviating markedly from the straight line. The correlation coefficient R indicates how precisely the individual measured values lie on the straight line, wherein the correlation coefficient R may assume values between −1 and +1. If the correlation coefficient R is equal to 0, then a straight line can not be drawn through the measured values, whereas on the other hand with values of −1 or +1 of the correlation coefficient R, the measured values lie exactly on a straight line. Consequently the individual windows show the absolute value (R) of the respective correlation coefficient R assigned to a reaction chamber 3 so that an operator, in the event of a marked deviation from 1, immediately recognizes that the synthesis in the reaction chamber concerned is not proceeding correctly, without the need to monitor a column of figures or a large number of measured values.

In a preferred embodiment of the invention, the last respective measured values are more heavily weighted than the other measured values. For example, in calculation of the correlation coefficient R the number pair (measured value $s_i$, numerator i) is weighted as much as all other measured values together, i.e. the number pair of the last measured value $s_i$ enters the calculation just as often as the other measured values, namely i−1 times. If the next measured value $s_{i+1}$ is obtained, then the increased weighting of the measured value $s_i$ is rescinded and the new measured value $s_{i+1}$ is weighted i times.

Due to this higher weighting of the last respective measured value the correlation coefficient, thus modified, responds more quickly to a deviation from the straight line. This allows the operator to detect and react quickly to errors.

In a preferred arrangement, several apparatuses according to the invention, e.g. 3 to 20 and preferably 6 or 12, are combined into a single unit and provided with a common supply for reagents, gas and electrical power. Each of the storage vessels containing the reagents has a level indicator, so that their level may be monitored automatically by a level monitoring instrument. If a level is low, then the level monitoring instrument gives a signal to the operator indicating that the reagent concerned requires topping-up or that the relevant storage vessel requires replacement. This level monitoring instrument permits semi-automatic and continuous operation of this unit comprised of several synthesising apparatuses.

With this arrangement, the reagents are held in the storage vessels under pressure from a protective gas. This protective gas has two functions. It is intended to prevent the reagents from coming into contact with moisture-laden air since, through contact with moist air, undesired reactions could occur and impair the functioning of the reagents. In addition, the protective gas exerts a pressure which assists the feeding of the reagents to the reaction chambers 3. Because of this, in drawing the reagents from the reaction chambers 3, the suction pump can operate with less vacuum, thus making it possible to use reagents with low vapour pressure too.

Preferably annular seal inserts are used at all exits of orifices and bores of the sliders through which chemicals are fed. These seal inserts are made of a wear-resistant plastic, e.g. Teflon.

It is also possible for the sliders to be made of plastic. Suitable plastics are Teflon, Peek and Pom.

The invention is described above with the aid of embodiments with three sliders. Corresponding apparatuses with four or more sliders are known. The invention may also be applied to such apparatuses. A slider, for the purposes of the present application, is any sliding plate or disc or any sliding rod. The sliders according to the invention are discs rotatable around an axis of rotation.

What is claimed is:

1. An apparatus for conducting chemical reactions comprising:
   a reaction slider in which are formed a multiplicity of through holes serving as reaction chambers,
   a selector slider located on a side of the reaction slider at which the reaction chambers emerge, and having a continuous control orifice, wherein the selector slider is movable relative to the reaction slider,
   a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved relative to the chemical slider by rotation around a common axis of rotation which passes through the centre point of the orbit that one of the feed holes, one of the reaction chambers and the control orifice may be brought into alignment, so that a through connection to supply the reaction chamber with a predetermined reagent may be made, and
   a device is provided for applying a force to the sliders in order to seal their contact faces, this device is acting on a connecting rod, which extends through central openings in the sliders, so that a force, which is applied by the device for applying a force to the sliders, acts in the area of the axis of rotation.

2. Apparatus according to claim 1, wherein the reaction slider and the selector slider are plate-shaped, in particular in the form of an annular disc.

3. Apparatus according to claim 1, wherein the selector slider and the reaction slider are driveable independently of one another.

4. Apparatus according to claim 1, wherein the device for applying pressure to the sliders may be driven electrically.

5. An apparatus for conducting chemical reactions comprising:
   a reaction slider in which are formed a multiplicity of through holes serving as reaction chambers,
   a selector slider located on a side of the reaction slider at which the reaction chambers emerge, and having a continuous control orifice, wherein the selector slider is movable relative to the reaction slider,
   a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made,
   a device, provided for applying a force to the sliders in order to seal their contact faces, the device acting on a connecting rod, which extends through central openings in the sliders, so that a force, which is applied by the device for applying a force to the sliders, acts in the area of the axis of rotation,
   wherein the device for applying pressure to the sliders is an electrically driven combined spring and magnet mechanism which presses a pressure piston against a pressure plate, with the sliders being arranged between the pressure plate and a stationary drive housing.

6. An apparatus for conducting chemical reactions comprising:
   a reaction slider in which are formed a multiplicity of through holes serving as reaction chambers,
   a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made; and, a device, provided for applying a force to the sliders in order to seal their contact faces, the device acting on a connecting rod, which extends through central openings in the sliders, so that a force, which is applied by the device for applying a force to the sliders, acts in the area of the axis of rotation, wherein a drive unit with a stationary cylindrical drive housing and two concentric hollow shafts arranged one inside the other, on which the reaction slider and the selector slider may be non-rotatably fitted.

7. An apparatus for conducting chemical reactions comprising:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made; and, a device, provided for applying a force to the sliders in order to seal their contact faces, the device acting on a connecting rod, which extends through central openings in the sliders, so that a force, which is applied by the device for applying a force to the sliders, acts in the area of the axis of rotation, wherein a drive unit with a stationary cylindrical drive housing and two concentric hollow shafts arranged one inside the other, on which the reaction slider and the selector slider may be non-rotatably fitted, and wherein the connecting rod extends through the hollow shafts and is pivotally connected, at the end furthest from the pressure piston, to a rocker arm which is pivotally connected at its other end to the device for applying pressure to the sliders.

8. Apparatus for conducting chemical reactions, comprising:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and one or more of the feed holes connected to a chemical feed line, which is connected to a valve assembly, via which at least two different chemicals may be supplied to the feed hole.

9. Apparatus according to claim 8, wherein the valve assemblies have at least two valves, each controlling the supply of a reagent.

10. Apparatus according to claim 8, wherein the valve assembly has a multiway valve which is switched alternately between the feed hole and at least two branch lines in such a way that the feed hole can be brought into communication with one of the two branch lines.

11. Apparatus according to claim 10, wherein the multiway valve is located directly on the chemical slider.

12. Apparatus for the conduct of an oligonucleotide synthesis, with several reaction chambers into which reagents may be metered, wherein there is provided a display unit with a window for each reaction chamber, wherein a significant value for the quality of the reaction proceeding in a particular reaction chamber is displayed in each of the individual windows.

13. Apparatus according to claim 12, wherein an optical sensor is provided to detect the light transmittance of the intermediate and end products produced in the reaction chambers.

14. Apparatus according to claim 13, wherein the optical sensor is mounted directly adjacent to the selector slider.

15. Apparatus according to claim 12, wherein the significant value for the reactions is the correlation coefficient R of measured values of a light transmittance measurement of the intermediate and end products.

16. Apparatus according to claim 15, wherein the significant value for the reactions is the absolute value of the correlation coefficient R of measured values of light transmittance measurement of the intermediate and end products.

17. Apparatus according to claim 15, wherein in each case the most recent value in the calculation of the correlation value is weighted more heavily than the other measured values.

18. Apparatus according to claim 12, wherein the apparatus for the conduct of an oligonucleotide synthesis comprises:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and a device is provided for applying a force to the sliders in order to seal their contact faces, this device is acting on a connecting rod, which extends through central openings in the sliders, so that a force, which is applied by the device for applying a force to the sliders, acts in the area of the axis of rotation.

19. Apparatus according to claim 12, wherein the apparatus for the conduct of an oligonucleotide synthesis comprises:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and one or more of the feed holes is or are connected to a chemical feed line, which is connected to a valve assembly, via which at least two different chemicals may be supplied to the feed hole.

20. An assembly having several apparatuses for conducting chemical reactions comprising:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and a device is provided for applying a force to the sliders in order to seal their contact faces, this device is acting on a connecting rod, which extends through central openings in the sliders, so that a force, which is applied by the device for applying a force to the sliders, acts in the area of the axis of rotation, wherein there is provided a common supply unit for reagents, with several storage vessels, wherein the storage vessels are provided with a level indicator, and a level monitoring device automatically monitors the levels of the individual storage vessels.

21. Assembly according to claim 20, wherein the common supply unit is also designed to supply gas and electrical power.

22. Assembly with several apparatuses for the conduct of chemical reactions comprising:

a reaction slider in which are formed a multiplicity of through holes serving as reaction chambers, a selector slider located on a side of the reaction slider at which the reaction chambers emerge, and having a continuous control orifice, wherein the selector slider is movable relative to the reaction slider, a chemical slider, located on the opposite side of the reaction slider to the selector slider, wherein feed holes for the supply of chemicals emerge on the surface of the chemical slider facing the selector slider, and the reaction chambers of the reaction slider and the feed holes of the chemical slider are arranged along an orbit, and the reaction slider and the selector slider may be so moved by rotation around a common axis of rotation which passes through the centre point of the orbit that one of the feed holes, one of the reaction chambers and the control orifice may be brought into alignment, so that a through connection to supply the reaction chamber with a predetermined reagent may be made, and one or more of the feed holes is or are connected to a chemical feed line, which is connected to a valve assembly, via which at least two different chemicals may be supplied to the feed hole, wherein there is provided a common supply unit for reagents, with several storage vessels, wherein the storage vessels are provided with a level indicator, and a level monitoring device automatically monitors the levels of the individual storage vessels.

23. Assembly according to claim 22, wherein the common supply unit is also designed to supply gas and electrical power.

24. The assembly according to claim 20 wherein the reaction slider and the selector slider may be moved relative to the chemical slider.

25. The apparatus according to claim 4, wherein the device for applying pressure to the sliders is a combined spring and magnet mechanism which presses a pressure piston against a pressure plate, with the sliders being arranged between the pressure plate and a stationary drive housing.

26. The apparatus according to claim 1, wherein a drive unit with a stationary cylindrical drive housing and two concentric hollow shafts arranged one inside the other, on which the reaction slider and the selector slider may be non-rotatably fitted.

27. The apparatus according to claim 26, wherein the connecting rod extends through the hollow shafts and is pivotally connected, at the end furthest from the pressure piston, to a rocker arm which is pivotally connected at its other end to the device for applying pressure to the sliders.

* * * * *